United States Patent
Wagner

(10) Patent No.: US 6,947,388 B1
(45) Date of Patent: Sep. 20, 2005

(54) METHOD AND SYSTEM FOR A REAL-TIME BANDWIDTH ALLOCATION SCHEDULER FOR MEDIA DELIVERY

(75) Inventor: Marcus Wagner, Santa Monica, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/421,806

(22) Filed: Oct. 20, 1999

(51) Int. Cl.[7] .............................. H04J 1/16; H04J 3/16
(52) U.S. Cl. ...................................... 370/252; 370/468
(58) Field of Search ................................ 370/252, 465, 370/468, 310.1, 230, 227, 232–235, 238, 260, 338, 345, 346, 347, 352, 353, 348, 395.1, 395.21, 395.41, 395.42–395.43, 473, 498

(56) References Cited

U.S. PATENT DOCUMENTS

| | | | | |
|---|---|---|---|---|
| 5,568,181 A | * | 10/1996 | Greenwood et al. ........... 725/92 |
| 5,600,573 A | * | 2/1997 | Hendricks et al. .......... 725/109 |
| 5,742,594 A | * | 4/1998 | Natarajan .................... 370/336 |
| 5,745,694 A | * | 4/1998 | Egawa et al. ............... 709/225 |
| 5,748,629 A | * | 5/1998 | Caldara et al. .............. 370/389 |
| 6,122,514 A | * | 9/2000 | Spaur et al. ................. 455/448 |
| 6,128,280 A | * | 10/2000 | Jamoussi et al. ........... 370/230 |
| 6,138,163 A | * | 10/2000 | Nam et al. .................... 709/231 |
| 6,240,553 B1 | * | 5/2001 | Son et al. ...................... 725/95 |
| 6,266,346 B1 | * | 7/2001 | Takeda et al. .............. 370/468 |
| 6,363,434 B1 | * | 3/2002 | Eytchison .................... 709/313 |
| 6,377,561 B1 | * | 4/2002 | Black et al. ................. 370/330 |
| 6,401,121 B1 | * | 6/2002 | Yoshida et al. ............. 709/227 |
| 6,614,804 B1 | * | 9/2003 | McFadden et al. ......... 370/468 |

* cited by examiner

*Primary Examiner*—Chau Nguyen
*Assistant Examiner*—Andy Lee
(74) *Attorney, Agent, or Firm*—Sawyer Law Group LLP

(57) ABSTRACT

The present invention provides a method and system for providing a bandwidth allocation scheduler for media delivery. The present invention includes determining an available bandwidth for file transmission for a time interval, and allocating at least a portion of the available bandwidth to at least one file transmission task, wherein a different amount of the available bandwidth may be allocated to each of the at least one file transmission tasks. The bandwidth allocation scheduler in accordance with the present invention comprises a set of program segments that provides fast, deterministic real-time scheduling for the allocation of bandwidth for file transmissions. It allows the bandwidth allocated to a delivery to vary according to the amount of bandwidth available. A different amount of bandwidth may be allocated to each individual file transmission task. Higher priority transmissions may be allocated bandwidth before allocation to lower priority file transmissions. The maximum bit rate of the slowest addressed receiver may be considered in allocating the bandwidth. Moreover, the customer can choose between different allocation strategies. Thus, the bandwidth allocation scheduler in accordance with the present invention reduces waste in bandwidth in media delivery, which in turn reduces costs for a customer.

16 Claims, 17 Drawing Sheets

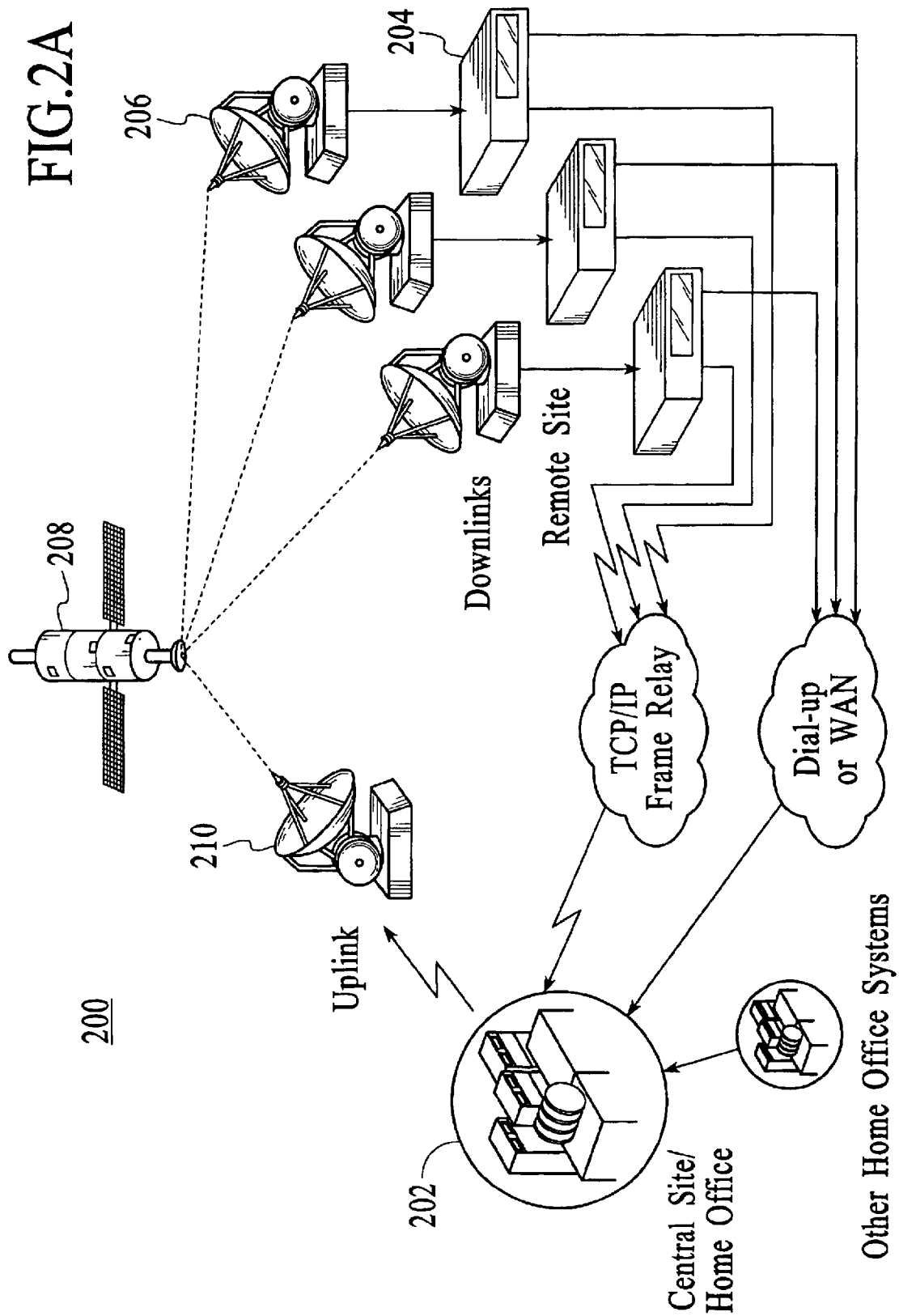

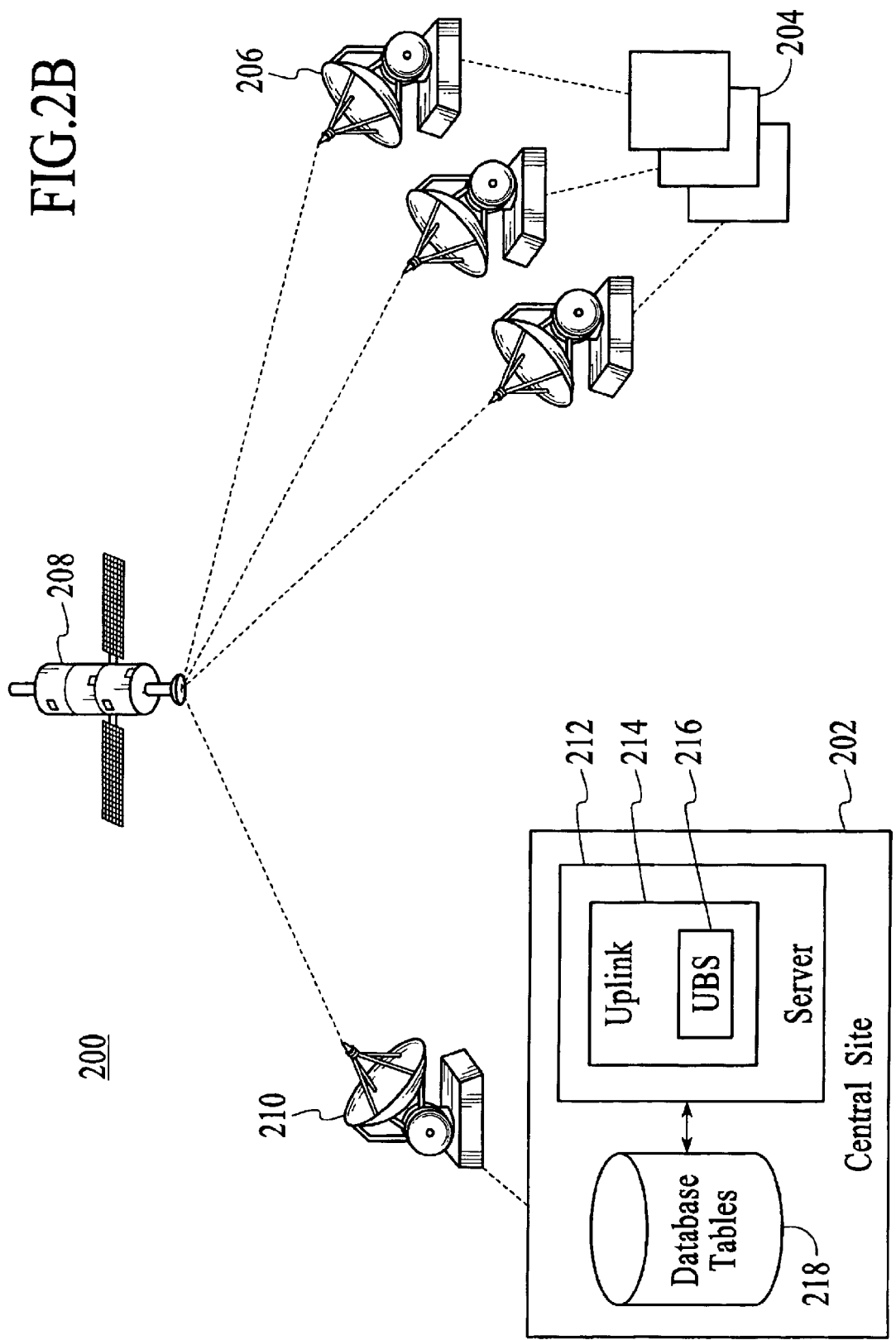

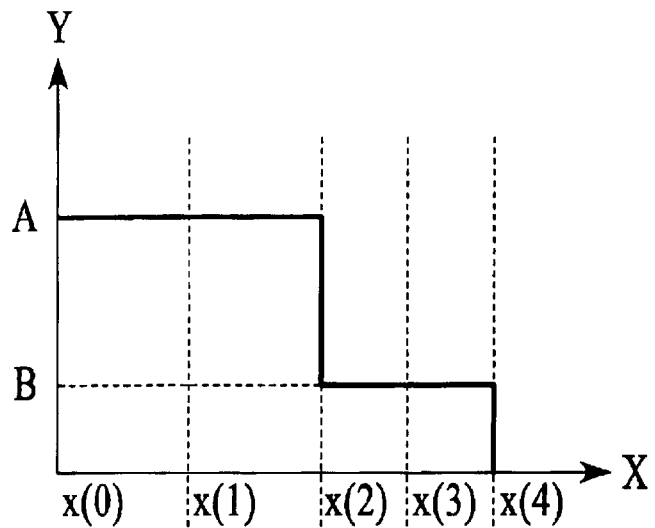
Step Function 1
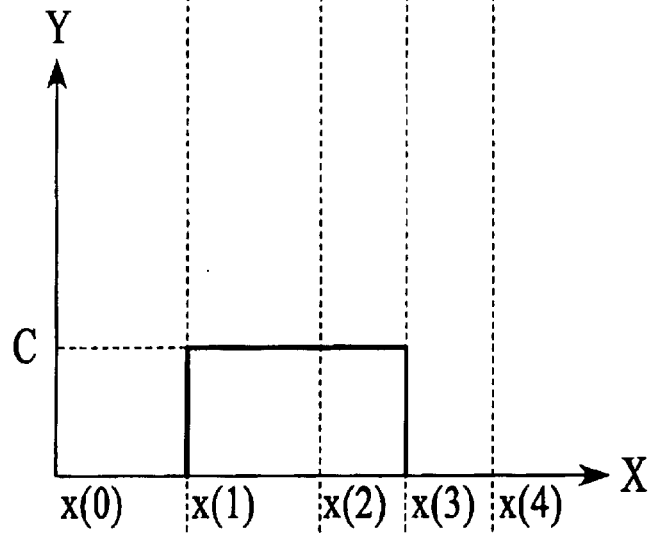
Step Function 2
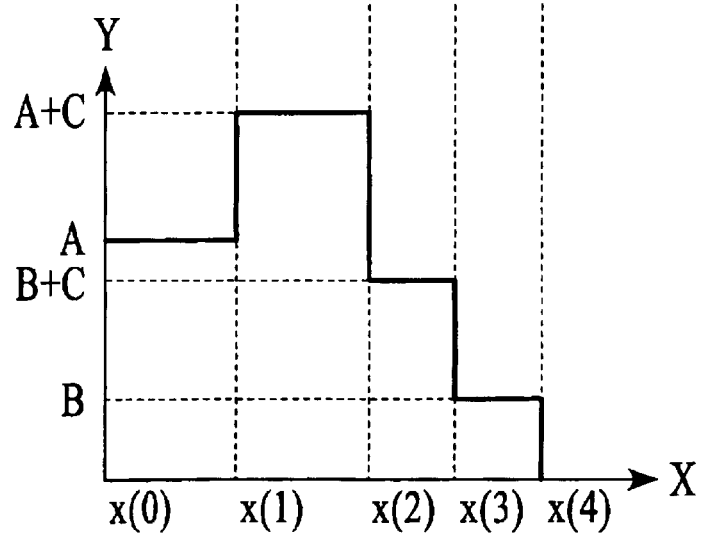
Step Function 1 + Step Function 2
FIG.4A

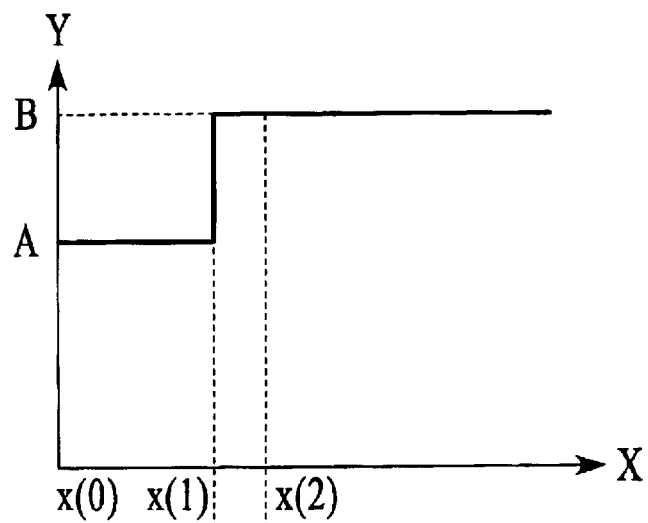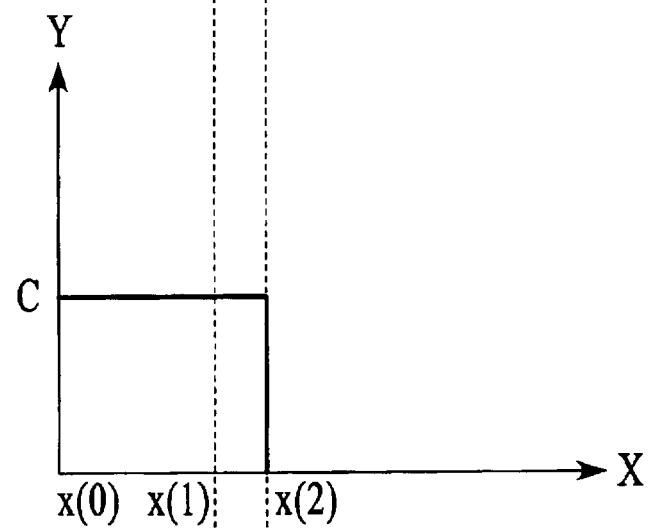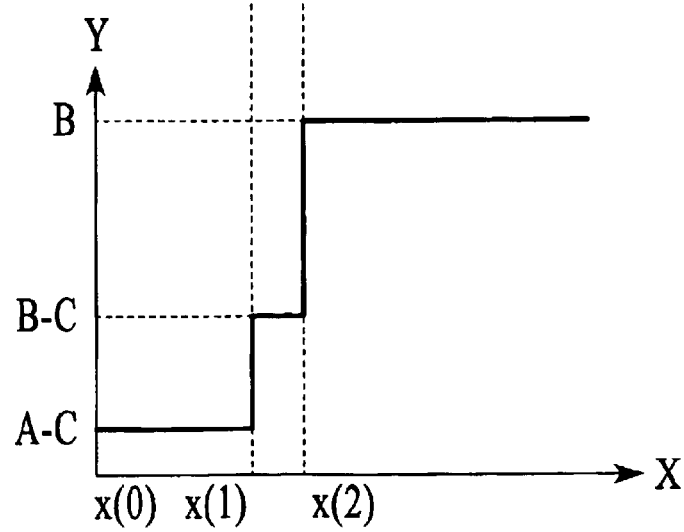
FIG.4B

METHOD AND SYSTEM FOR A REAL-TIME BANDWIDTH ALLOCATION SCHEDULER FOR MEDIA DELIVERY

FIELD OF THE INVENTION

The present invention relates to file transmissions, and more particularly to bandwidth allocation for file transmissions.

BACKGROUND OF THE INVENTION

FIG. 1 illustrates a conventional satellite communications network 100 which is used to transmit data from a terrestrial sender 110, located at the "central site" 102, via the satellite 118 to a number of receivers 112–116 at "remote sites" 104–108. The transmitted data may be binary encoded files or some other file format. The network 100 includes the central site 102, the associated satellite transponder 110, the satellite 118, and the remote sites 104, 106, 108, with their respective receivers 112, 114, 116. Only three remote sites are shown in FIG. 1, however, a typical satellite communications network may transmit data to thousands of receivers. A customer of the network 100 purchases a certain amount of bandwidth on the satellite transponder 110, typically for extended periods of time. E.g., a customer might lease bandwidth in the amount of 10 Mega bits per second (Mbps) on a transponder with a total capacity of 36 Mbps, for one or several months at a time.

Typically, a customer will transmit files from his/her central site 102 to one, some, or all remote sites 104–108, as soon as the file is available for transmission, and typically, all file transmissions are made at a fixed bandwidth. The bandwidth setting can be limited from above, by (A) the remaining available bandwidth on the transponder 110, given that on some systems, more than one file can be transmitted simultaneously from one transponder to (typically) disjunct sets of receivers, by (B) the maximum receive bit rate of the slowest receivers 112–116 addressed by the file transmission in question and by (C), maximum encoding rates of forward error correction equipment. The bandwidth setting for any one file transmission may also have to be limited from below, because most files have a Latest Delivery Time (LTD), i.e., the deadline by which the customer wants the file received correctly by all addressed remote sites. Missing that deadline would imply financial loss to the customer, and may make a file transmission obsolete. However, setting the bandwidth for all file transmission slow enough to accommodate the slowest receiver addressed by a particular transmission, will often place an unnecessarily restrictive upper limit on the bandwidth from many other file transmissions, which may not address the slowest receiver in the first transmission.

Moreover a typical file transmission system will not account for the fact that often, the amount of bandwidth available on the transponder for file transmissions is not constant, even though the total amount of bandwidth leased by the customer is. This is because some of that leased bandwidth may also be used, at times, for transmissions and other data, such as Live Video Streams (LVS), which require a fixed and very stable amount of bandwidth. To avoid over subscription of transponder bandwidth, a conventional file transmission system will typically limit itself to never use more bandwidth for file transmissions than what is available while the video stream is being transmitted, i.e., the worst-case scenario for file transmissions, implying that the amount of bandwidth reserved for life video goes to waste when none is being transmitted, which may be most the time. Waste of transponder bandwidth is costly, and is especially undesirable if, at the same time, some files cannot be transmitted early enough to meet their delivery deadlines.

Accordingly, there exists a need for a method and system for providing an improved bandwidth allocation scheduler for media delivery. The method and system should allocate bandwidth such that waste in bandwidth is reduced, thus reducing the cost for the customer. The present invention addresses such a need.

SUMMARY OF THE INVENTION

The present invention provides a method and system for providing a bandwidth allocation scheduler for media delivery. The present invention includes determining an available bandwidth for file transmission for a time interval, and allocating at least a portion of the available bandwidth to at least one file transmission task, wherein a different amount of the available bandwidth may be allocated to each of the at least one file transmission tasks. The bandwidth allocation scheduler in accordance with the present invention comprises a set of program segments that provide fast, deterministic real-time scheduling for the allocation of bandwidth for file transmissions. It allows the bandwidth allocated to a delivery to vary according to the amount of bandwidth available. A different amount of bandwidth may be allocated to each individual file transmission tasks. Higher priority transmission may be allocated bandwidth before allocation to lower priority file transmissions. The maximum bit rate of the slowest addressed receiver may be considered in allocating the bandwidth. Moreover, the customer can choose between different allocation strategies. Thus, the bandwidth allocation scheduler in accordance with the present invention reduces waste in bandwidth in media delivery, which in turn reduces costs for a customer.

BRIEF DESCRIPTION OF THE DRAWINGS

FIGS. 2A and 2B illustrate a preferred embodiment of a network in accordance with a method and system of the present invention.

FIGS. 4A–4B illustrate an example of the addition and subtraction of step functions.

DETAILED DESCRIPTION

Figure 1:
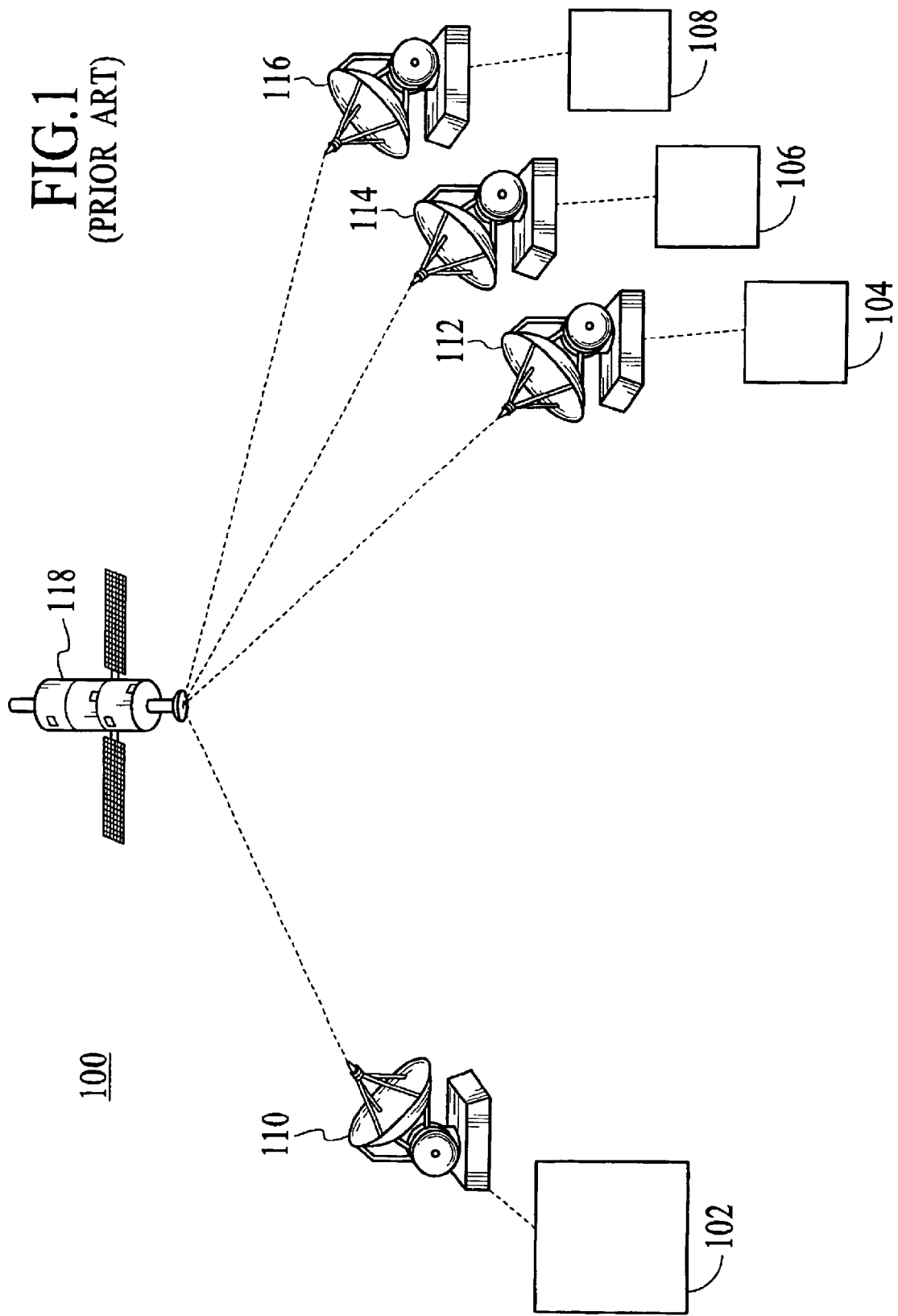
FIG. 1 illustrates a conventional satellite communications network which delivers files between various locations.

The present invention relates to a method and system for providing an improved bandwidth allocation scheduler for media delivery. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The method and system in accordance with the present invention provides an improved bandwidth allocation scheduler for media delivery by allowing the bandwidth allocated to a delivery to vary according to the amount of bandwidth available. To more particularly describe the features of the present invention, please refer to FIGS. 2 through 15 in conjunction with the discussion below.

FIGS. 2A and 2B illustrate a preferred embodiment of a network in accordance with a method and system of the present invention. As illustrated in FIG. 2A, the network 200 comprises a central site 202 and remote sites 204. At the central site 202 is a satellite transponder 210 which transmits data to the satellite 208 for delivery to all addressed receivers 206. Each receiver 206 has its own maximum bit transfer rate. For example, the central site 202 may be the headquarters for a retail chain while the remote sites 204 are the retail stores located around the world. The retail chain is thus the customer of the network 200, purchasing a certain amount of bandwidth on the satellite transponder 210. As illustrated in FIG. 2B, the central site 202 comprises a server 212, which further comprises a software called Uplink 214, which manages file transmissions via the satellite transponder 210. Uplink 214 includes an Uplink Bandwidth Scheduler 216 (UBS). The UBS 216 is a set of program segments, or functions, that is invoked by Uplink 214 for fast, deterministic real-time scheduling for the allocation of bandwidth for file transmissions. The UBS 216 allocates bandwidth based upon the total available bandwidth available for file transmissions, the allocation strategy indicated by the customer, the delivery deadline of each file, and the sizes of the files waiting for transmission. Uplink 214 obtains necessary system configuration parameters and other information needed for bandwidth allocation from database tables 218.

Figure 3:
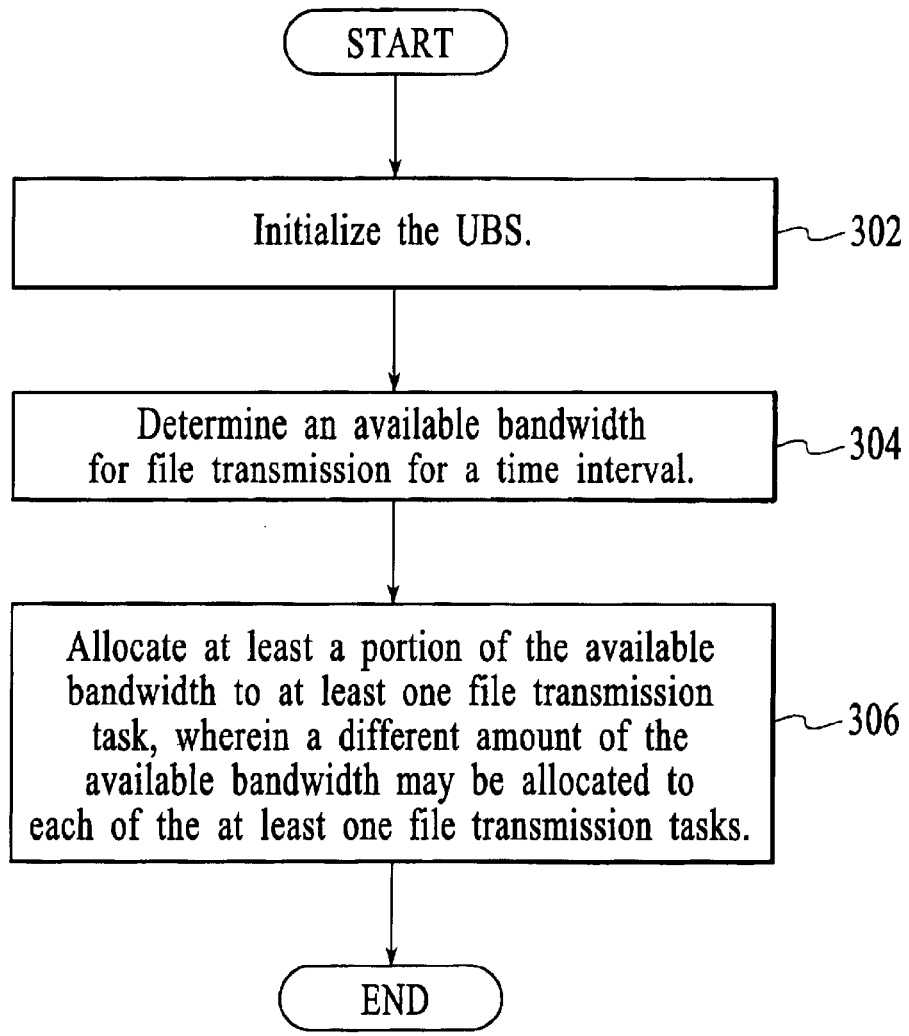
FIG. 3 is a flow chart illustrating a preferred embodiment of a method for bandwidth allocation used by the bandwidth allocation scheduler in accordance with the present invention.

FIG. 3 is a flow chart illustrating a preferred embodiment of a method for bandwidth allocation used by the UBS 216 in accordance with the present invention. After the UBS 216 is initialized, via step 302, it determines the available bandwidth for file transmission for a particular time interval, via step 304. In the preferred embodiment, this time interval is defined as the current time plus the maximum duration for any one file transmission task. This maximum duration is a system parameter set by the customer and stored in the database tables 218. If a sufficient amount of bandwidth will be available on the transponder 210 for long enough to complete at least one file transmission task, then the UBS 216 allocates at least a portion of the available bandwidth to the at least one file transmission task, via step 306, where each of the at least one file transmission task may be allocated a different amount of the available bandwidth. Uplink 214 may then transmit the at least one file transmission task. After transmission, the UBS 216 may free any allocated available bandwidth unused by the transmission so that it may be used by other file transmission tasks.

The preferred embodiment of the UBS 216 must meet certain boundary conditions:

(1) The total available bandwidth of the satellite transponder 210 used for file transmissions must be shared with bandwidth allocations for live video streams (LVS). In the preferred embodiment, LVS jobs are given higher priority than file transmissions.

(2) The UBS 216 must ensure that a file is not transmitted if its size exceeds a maximum size parameterized by the customer, or if its transmission would exceed a maximum file transmission duration, also parameterized by the customer.

(3) The amount of bandwidth allocated must not exceed the smaller of: the total currently available bandwidth, and the largest bit rate at which the slowest receivers 206 can receive. Otherwise the interface between the server 212 and the satellite transponder 210 is likely to freeze, which requires a reboot to fix, resulting in a significant disruption of the media delivery.

To accomplish the steps in FIG. 3 within the above boundary conditions, the preferred embodiment of the UBS 216 comprises five primary functions: (1) Constructor, (2) Update Bandwidth Available, (3) Check For Available Bandwidth, (4) Allocation Request, and (5) Free Allocated Bandwidth. Before any bandwidth is allocated for file transmission, the Constructor function of the UBS 216 is called by Uplink 214 to initialize the UBS 216, via step 302. Next, the Update Bandwidth Available and Check For Available Bandwidth functions are called to determine the available bandwidth for the time interval, via step 304. The Allocation Request function is called to allocate at least a portion of the available bandwidth to the at least one file transmission task, via step 306. Uplink 214 then transmits the at least one file transmission task. Once transmitted, the Free Allocated Bandwidth function is called to free any unused bandwidth that had been allocated to that task.

To manage in memory the available bandwidth during the time interval, the UBS 216 uses step functions. Step functions are piecewise constant functions represented by a positive integer number of points in a two-dimensional space, (X, Y). One step function may be added to, subtracted from, or appended to another step function, provided both use the same data type for their X values and the Y values. FIGS. 4A–4B illustrate an example of the addition and subtraction of step functions. FIG. 4A illustrates the addition of step functions 1 and 2. FIG. 4B illustrates the subtraction of step function 4 from step function 3. Step functions, in the context of the present invention, are the elementary objects upon which the operations to schedule and allocate bandwidths are defined and executed by the UBS 216.

In the context of the UBS 216, the X values represent time, while the height of the Y values represent bandwidth. The UBS 216 uses a global step function (GSF) to represent the total maximum bandwidth available in the network 200 in the time interval. The UBS 216 adds, subtracts, or appends to the GSF. The added or subtracted step function has the shape of a rectangle and will be referred to as a "strip". A strip is represented by two points, where the X value of the first point marks the onset/beginning time of the allocation, and the Y value represents the amount of bandwidth allocated. The second point of the strip marks the end of the allocation, where its bandwidth value drops back to zero. Steps functions 2 and 4, FIGS. 4A and 4B respectively, illustrate examples of strips. The area of the strip represents the total amount of transmission data, including transmission protocol overhead of a file transmission task. If a strip is too high, i.e., too much bandwidth, to fit under the GSF, then the strip has to be wider, i.e., take more time. If the strip is too wide, i.e., take too much time, then the strip has to be higher, i.e., use more bandwidth, to be sent faster. The use of step functions in the preferred embodiment of the UBS 216 will be described in further detail later in this specification.

Constructor Function

Figure 5:
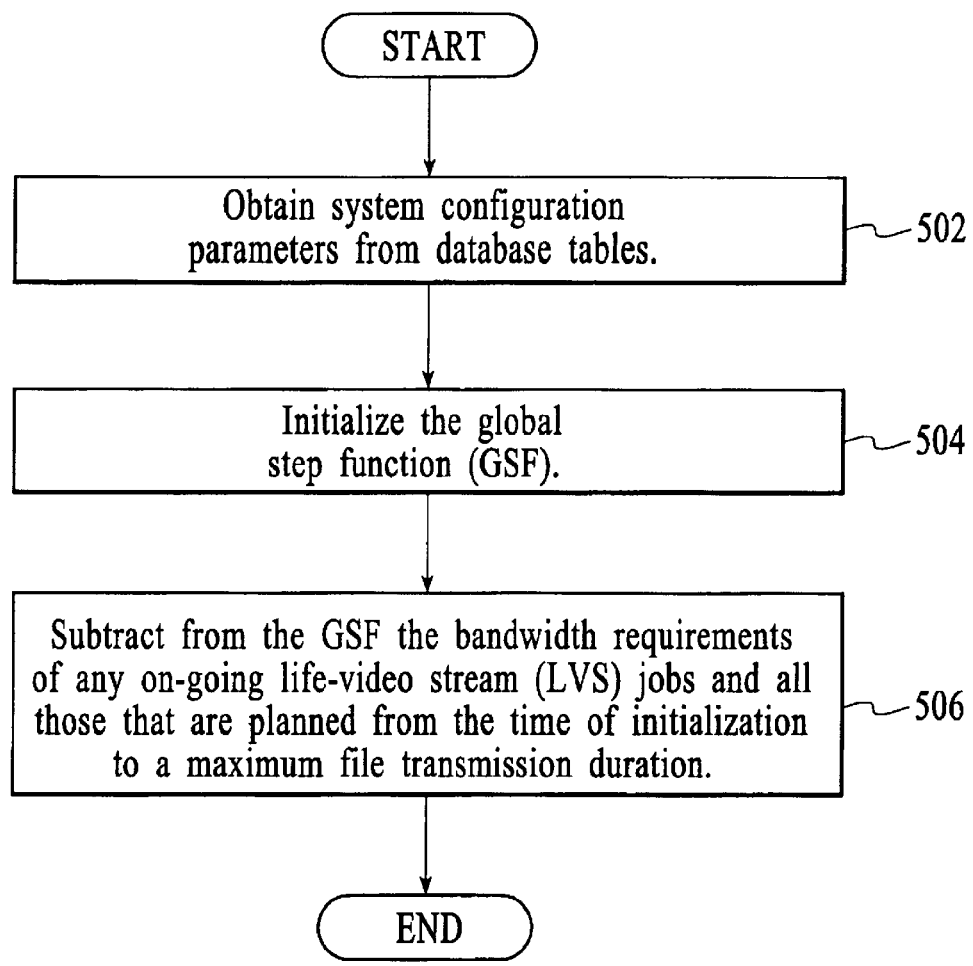
FIG. 5 is a flow chart illustrating a preferred embodiment of the Constructor function in accordance with the present invention.

The Constructor function constructs and initializes the UBS 216, via step 302 of FIG. 3. This occurs when Uplink 214 is first invoked. FIG. 5 is a flow chart illustrating a preferred embodiment of the Constructor function in accordance with the present invention. First, the Constructor function obtains the system configuration parameters from the database tables 218, via step 502. Then, it initializes the GSF, via step 504. The Constructor function subtracts from the GSF the bandwidth requirements of any on-going LVS jobs and all those that are planned from the time of the initialization to the maximum transmission duration set by the customer, via step 506. This information concerning the LVS jobs were obtained from the database tables 218. One of the boundary conditions is for LVS jobs to be given a higher priority than file transmissions. Thus, to preserve this priority, the UBS 216 first subtracts the bandwidth needed for LVS jobs before allocating the remaining bandwidth to any file transmission tasks.

Figure 6:
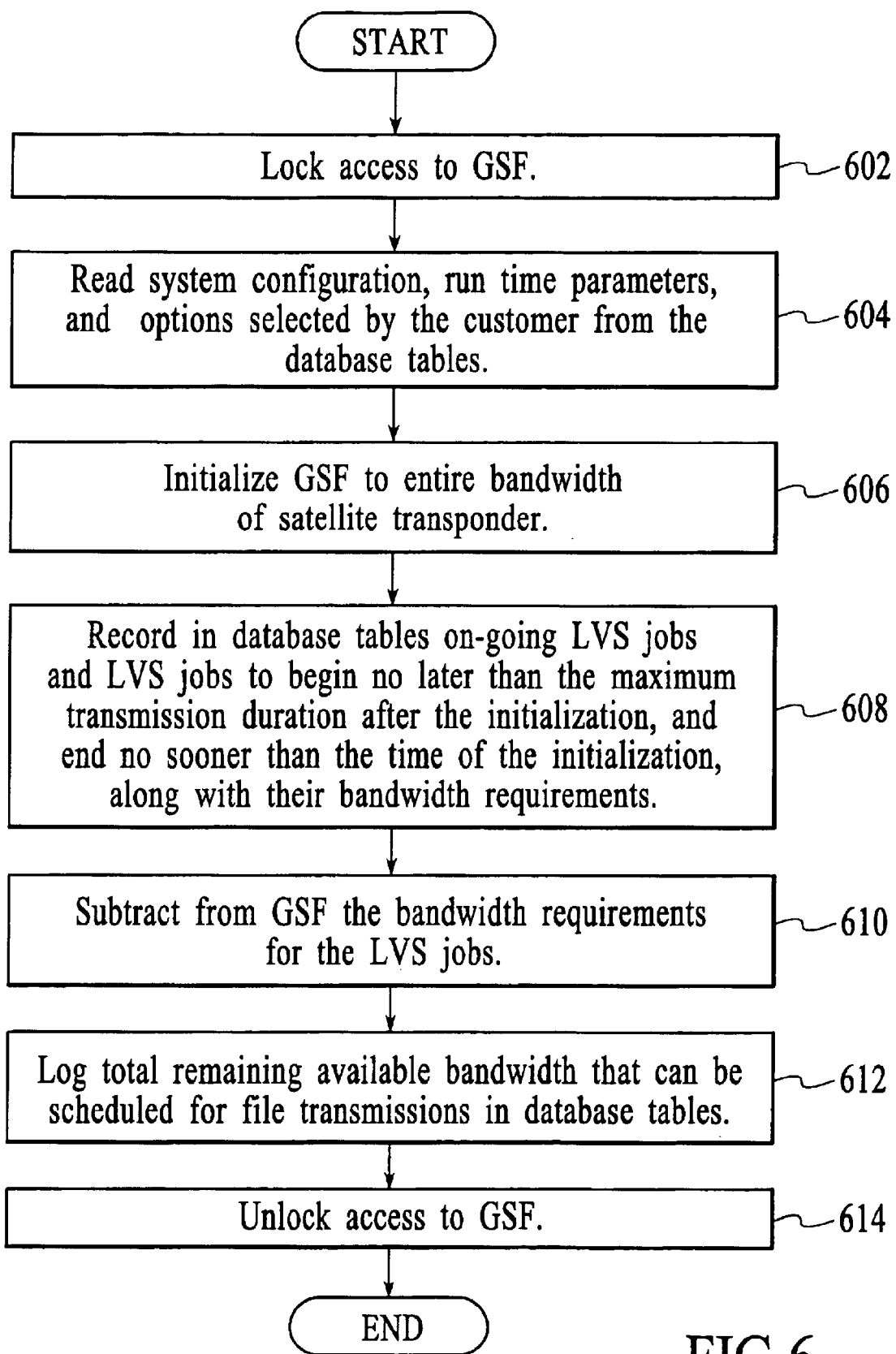
FIG. 6 is a flow chart illustrating in more detail the Constructor function in accordance with the present invention.

FIG. 6 is a flow chart illustrating in more detail the Constructor function in accordance with the present invention. First, access to the GSF is locked, via step 602. Next, the UBS 216 reads the system configuration, run time parameters, and options selected by the customer from the database tables 218, via step 604. Next, the GSF is initialized to the entire bandwidth of the satellite transponder 210, via step 606. Then the LVS jobs to begin no later than the maximum transmission duration after the initialization, and end no sooner than the time of the initialization, are recorded in the database tables 218, along with their bandwidth requirements, via step 608. The bandwidth requirements are subtracted from the GSF, via step 610. The total remaining available bandwidth that can be scheduled for file transmissions are logged in the database tables 218, via step 612. Then, access to the GSF is unlocked, via step 614.

Once the UBS 216 is initialized via the Constructor function, the Update Bandwidth Available and the Check For Available Bandwidth functions are invoked to determined the bandwidth available for file transmissions, via step 304 of FIG. 3.

Update Bandwidth Available Function

Figure 7:
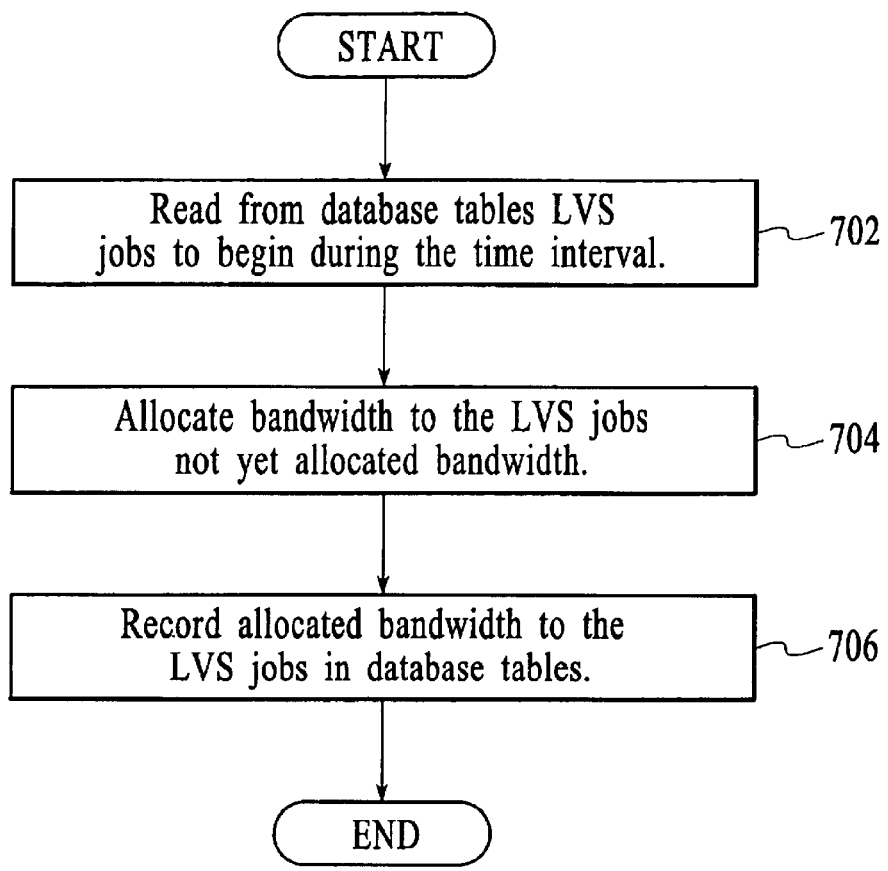
FIG. 7 is a flow chart illustrating a preferred embodiment of the Update Bandwidth Available function in accordance with the present invention.

The Update Bandwidth Available function allows the UBS 216 to update the GSF according to changes and new entries to the LVS job schedule. This function is called at regular time intervals set such that the function is called often enough for the UBS 216 to prevent conflicts with LVS jobs. FIG. 7 is a flow chart illustrating a preferred embodiment of the Update Bandwidth Available function in accordance with the present invention. First, the LVS jobs that are planned to begin during the time interval are read from the database tables 218, via step 702, from the current time to the maximum file transmission duration after the current time. Next, the function allocates bandwidth to the LVS jobs that have not yet been allocated any bandwidth, via step 704. Then, these allocated bandwidths for the LVS jobs are recorded in the database tables 218, via step 706.

Figure 8:
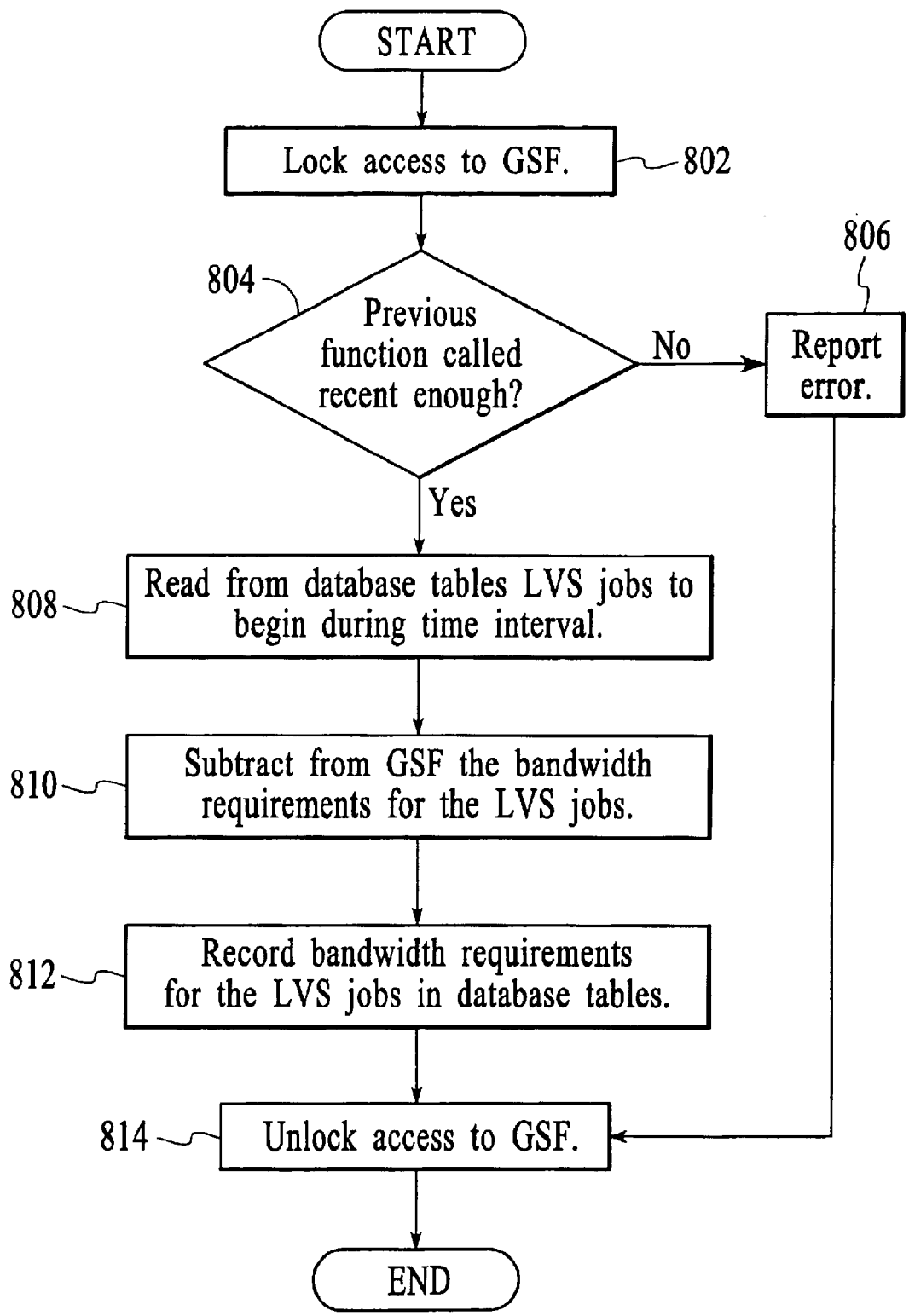
FIG. 8 is a flow chart illustrating in more detail the preferred embodiment of the Update Bandwidth Available function in accordance with the present invention.

FIG. 8 is a flow chart illustrating in more detail the preferred embodiment of the Update Bandwidth Available function in accordance with the present invention. First, access to the GSF is locked, via step 802. Next, it is determined if the previous function was called recent enough to prevent any conflicts with LVS jobs, via step 804. If not, then the error is reported, via step 806, and the execution of the function ends. If so, then the LVS jobs to begin during the time interval are read from the database tables 218, via step 808. The bandwidth requirements for the LVS jobs are then subtracted from the GSF, via step 810. The bandwidth requirements are also recorded in the database tables 218, via step 812. Access to the GSF is then unlocked, via step 814.

Check For Available Bandwidth Function

Figure 9:
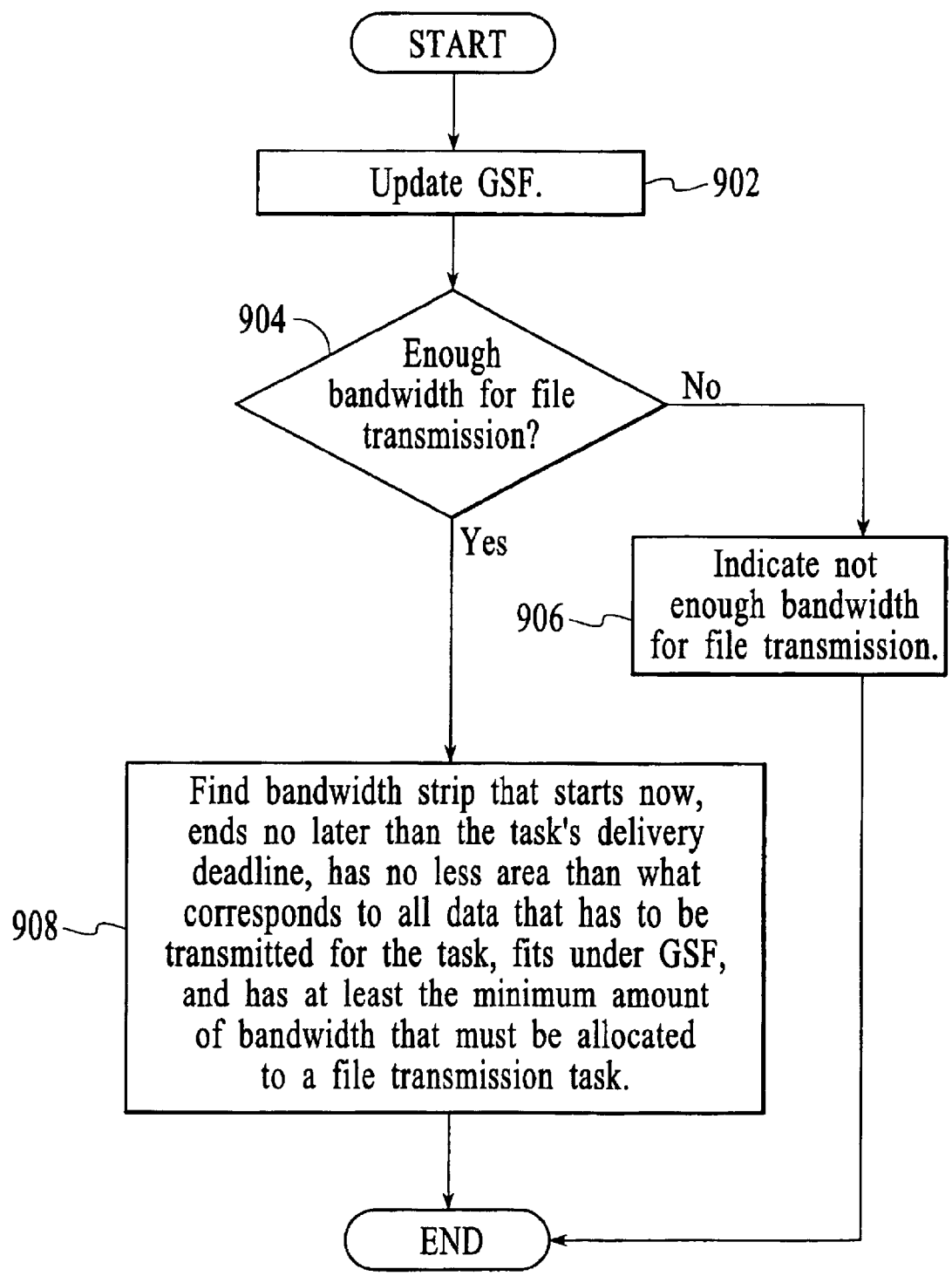
FIG. 9 is a flow chart illustrating a preferred embodiment of the Check For Available Bandwidth function in accordance with the present invention.

The Check For Available Bandwidth function determines the amount of data which may be transmitted within the available bandwidth. FIG. 9 is a flow chart illustrating a preferred embodiment of the Check For Available Bandwidth function in accordance with the present invention. First, the function updates the GSF so that its first point corresponds to the current time, via step 902. Then, the function determines if there is enough bandwidth for file transmission, via step 904. If not, then an indication that there is not enough bandwidth for file transmission is given, via step 906, and the execution of the function ends. If so, then the function finds the bandwidth strip that starts at the current time, ends no later than the task's delivery deadline, has no less area than what corresponds to all data that has to be transmitted for this task, fits under the GSF, and has at least the minimum amount of bandwidth that must be allocated to a file transmission task, via step 908. The minimum bandwidth is a parameter set by the customer. This function allows for the identification of the amount of data which may be transmitted within the available bandwidth so that only those files which may be successfully delivered need to be retrieved for transmission. This reduces the demands on the processor (not shown) of the server 212 and requires less memory.

Figure 10:
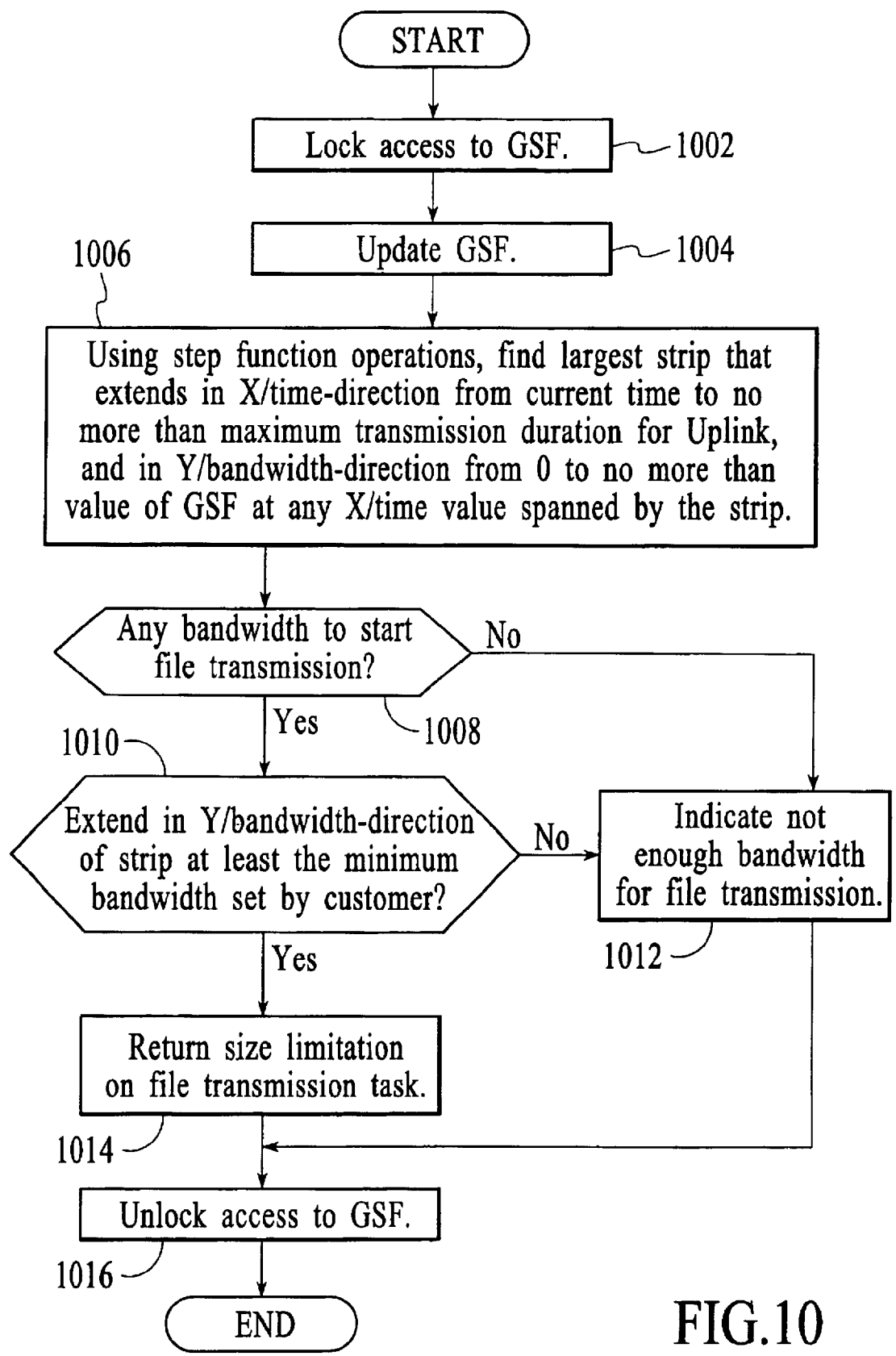
FIG. 10 is a flow chart illustrating in more detail the Check For Available Bandwidth function in accordance with the present invention.

FIG. 10 is a flow chart illustrating in more detail the Check For Available Bandwidth function in accordance with the present invention. First, access to the GSF is locked, via step 1002. The GSF is then updated, via step 1004, so that its first point corresponds to the current time. Next, using step function operations, the largest strip that will fit under the GSF is determined, via step 1006. The largest strip is the strip that extends in X/time-direction from the current time to no more than the maximum transmission duration for Uplink 214, and in the Y/bandwidth-direction from zero to no more than the value of the GSF at any X/time value spanned by the strip. If the strip shows that there is no bandwidth to start any file transmissions at this time, via step 1008, or that the extent of the strip in the Y/bandwidth-direction is smaller than the minimum extent set by the customer for file transmission, via step 1010, then an indication that there is enough bandwidth for file transmission is provided, via step 1012. Otherwise, the size limitation on file transmission tasks, i.e., the size of the strip, is returned, via step 1014. Access to the GSF is then unlocked, via step 1016.

Once the amount of bandwidth available for file transmission for the time interval is determined by the invocation of the Update Bandwidth Available and Check For Available Bandwidth functions, portions of the available bandwidth may be allocated to file transmission tasks, via step 306 of FIG. 3, by invoking the Allocation Request function.

Allocation Request Function

Figure 11:
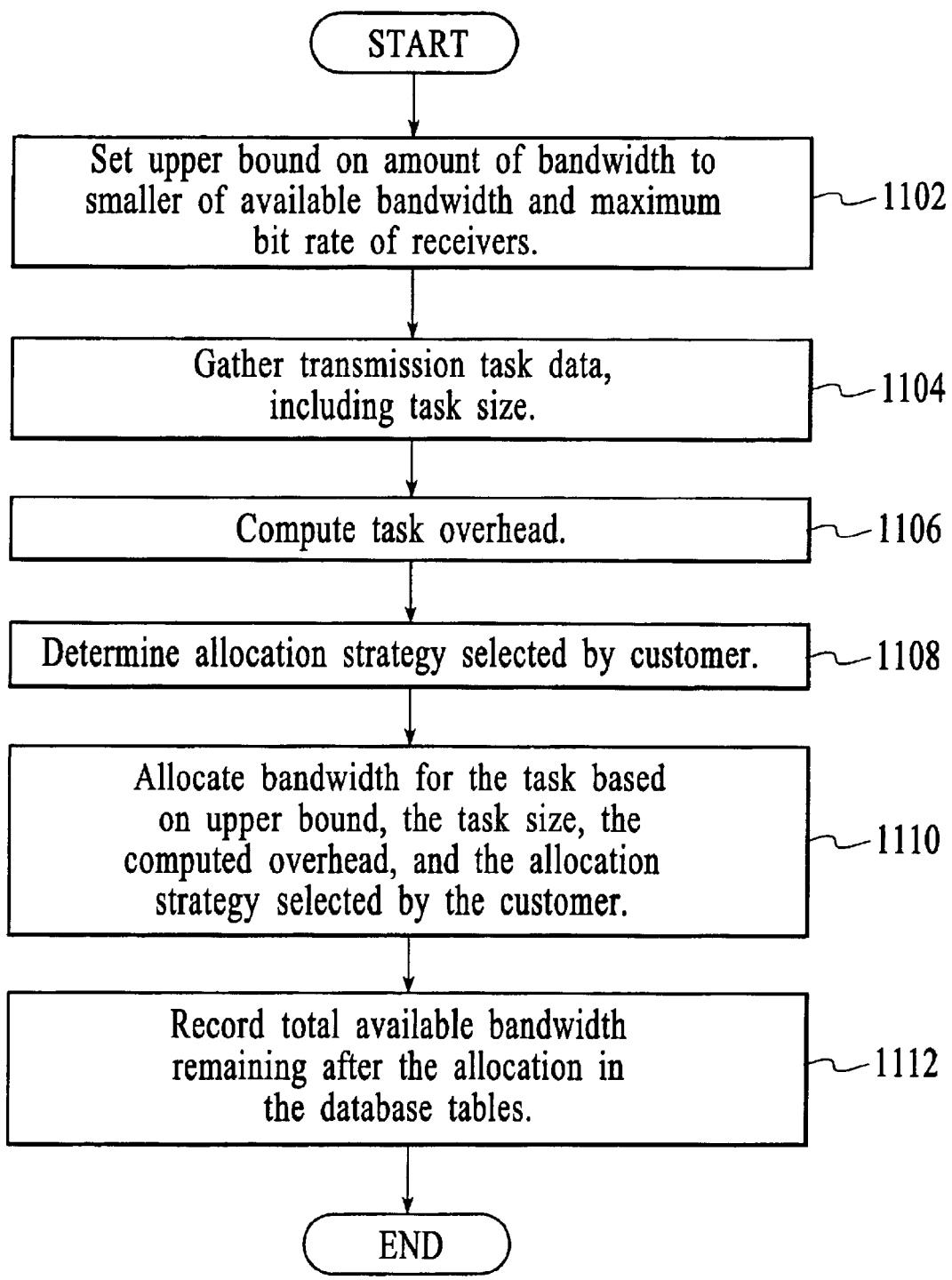
FIG. 11 is a flow chart illustrating a preferred embodiment of the Allocation Request function in accordance with the present invention.

The Allocation Request function allocates the bandwidth for the file transmission task, subtracts the bandwidth allocated from the total available bandwidth, and computes transmission parameters for the file transmission task. FIG. 11 is a flow chart illustrating a preferred embodiment of the Allocation Request function in accordance with the present invention. First, the function sets the upper bound on the amount of bandwidth to allocate to the smaller of the available bandwidth and the maximum bit rate of the slowest receiver 206, via step 1102. Next, the function gathers transmission task data, via step 1104, which includes the task size. The task size is the sum of all file sizes in the task. Other transmission task data gathered includes the number of files and the number of destinations. Next, the function computes the task overhead, via step 1106. The amount of task overhead is based on the number of files to be transmitted, the number of destinations the files are sent to, the maximum allowed time for transmission of incorrectly received data, and the processing overhead required by Uplink 214. The allocation strategy selected by the customer is determined, via step 1108. The allocation strategies are described in more detail later in this specification. Once the transmission task data is gathered and the task overhead is computed, the function allocated bandwidth for the task based upon the upper bound, the task size, the computed overhead, and the allocation strategy selected by the customer, via step 1108. The total available bandwidth remaining after the allocation is recorded in the database table 218, via step 1110.

Figure 12:
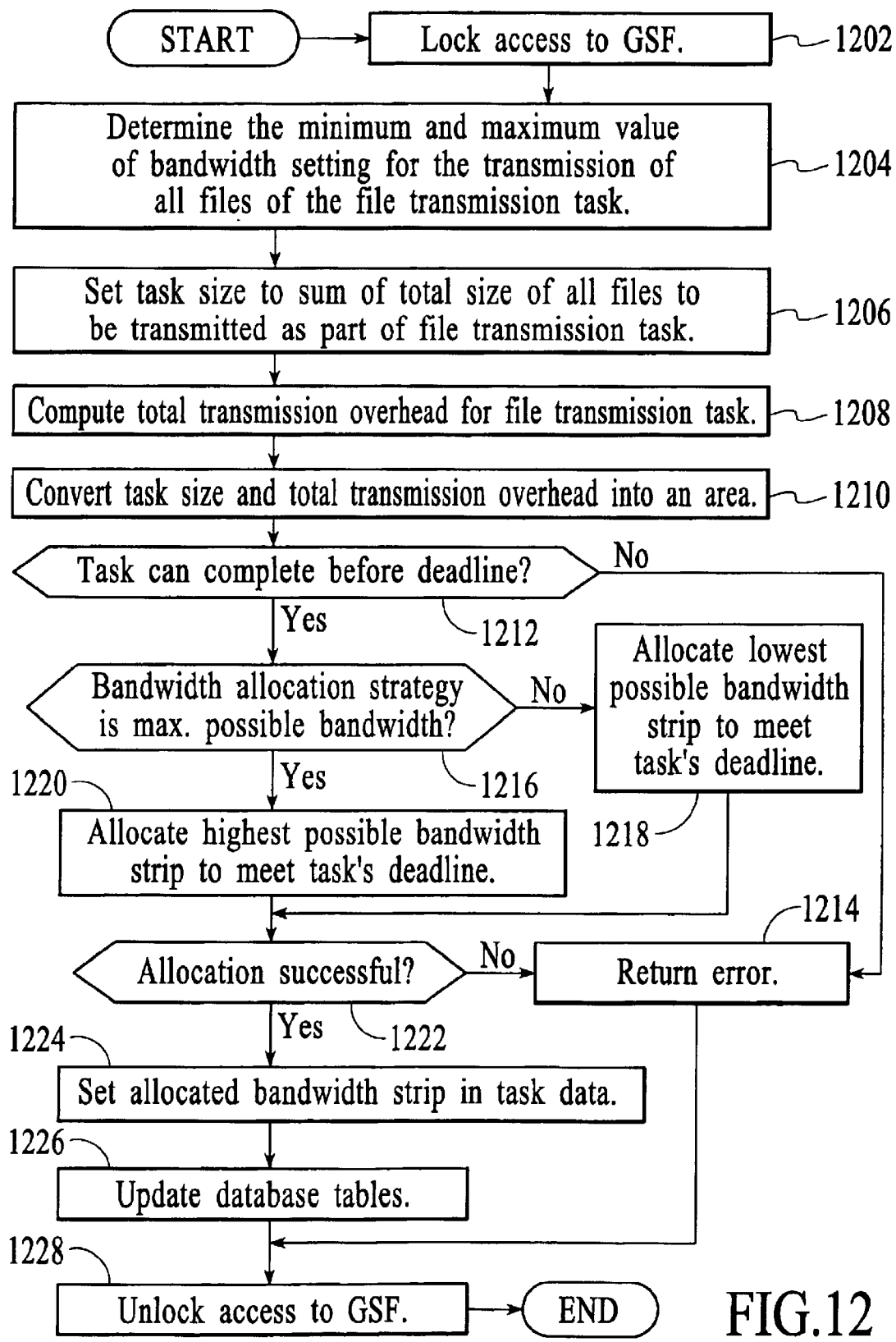
FIG. 12 is a flow chart illustrating in more detail the preferred embodiment of the Allocation Request Function in accordance with the present invention.

FIG. 12 is a flow chart illustrating in more detail the preferred embodiment of the Allocation Request Function in accordance with the present invention. First, access to the GSF is locked, via step 1202. Next, the minimum and maximum values of the bandwidth within which the function is to complete the transmission of all files of the file transmission task is determined, via step 1204. The minimum and maximum values are based on the maximum available bandwidth, the maximum bandwidth of the slowest addressed receiver, and the minimum bandwidth to allocate for any file transmission, as parameterized by the customer. The task size is then set to the sum of the total size of all files to be transmitted as part of the file transmission task, via step 1206. Next, the total transmission overhead is computed for the file transmission task, via step 1208. The task size and the total transmission overhead is then converted into an area, via step 1210. The area represents the total equivalent amount of data to transmit for this allocation request. Based on the task size and the transmission overhead, the function determines if the task can be completed before its deadline, via step 1212. In the preferred embodiment, each file transmission has an Earliest Delivery Time (EDT) and a Latest Delivery Time (LDT). For a file to be successfully delivered within the available bandwidth, the file must be transmitted between the EDT and the LDT to be of value to the customer. If the task cannot be completed before its deadline, then an error is returned, via step 1214. If so, then the function determines which allocation strategy has been chosen by the customer, via step 1216.

In the preferred embodiment, there are two available allocation strategies, Maximum Possible Bandwidth and Minimum Possible Bandwidth, from which the customer may select. Other allocation strategies may be provided without departing from the spirit and scope of the present invention. The Minimum Possible Bandwidth strategy allocates to each file transmission task as little bandwidth as possible to meet the files' LDT. This allows for more file transmission tasks to be performed at the same time. The Maximum Possible Bandwidth strategy allocates to each file transmission task as much bandwidth as possible given the currently available bandwidth and the receiver bit rates. Step functions are used to apply these strategies.

Figure 13A:
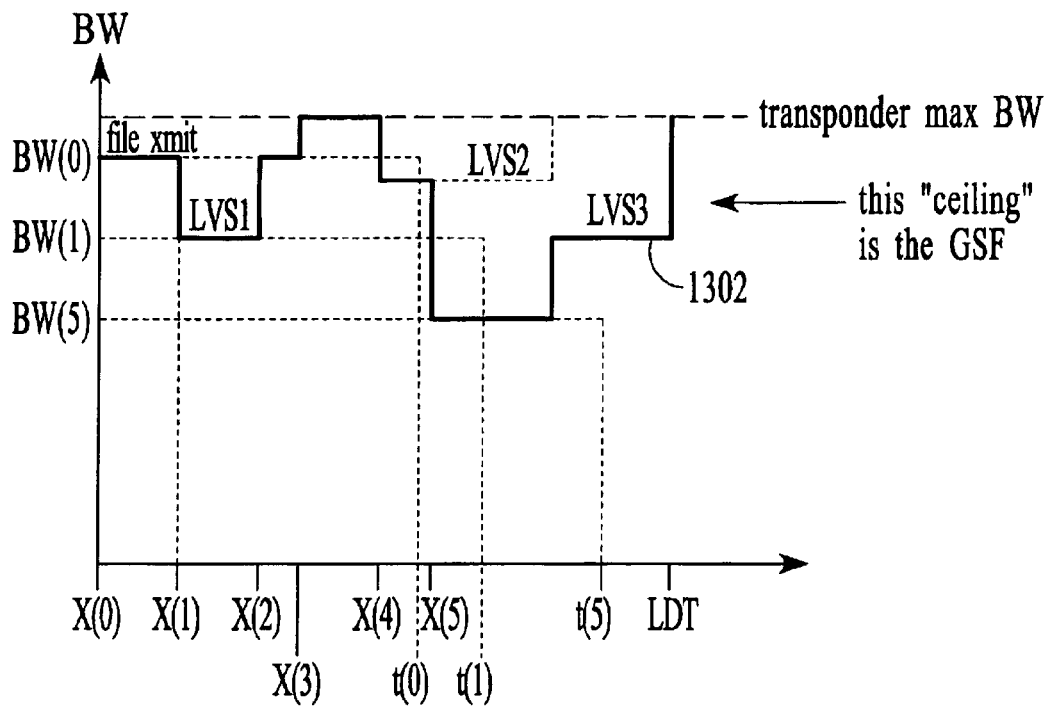
FIG. 13A illustrates the Maximum Possible Bandwidth strategy in accordance with the present invention.
Figure 13B:
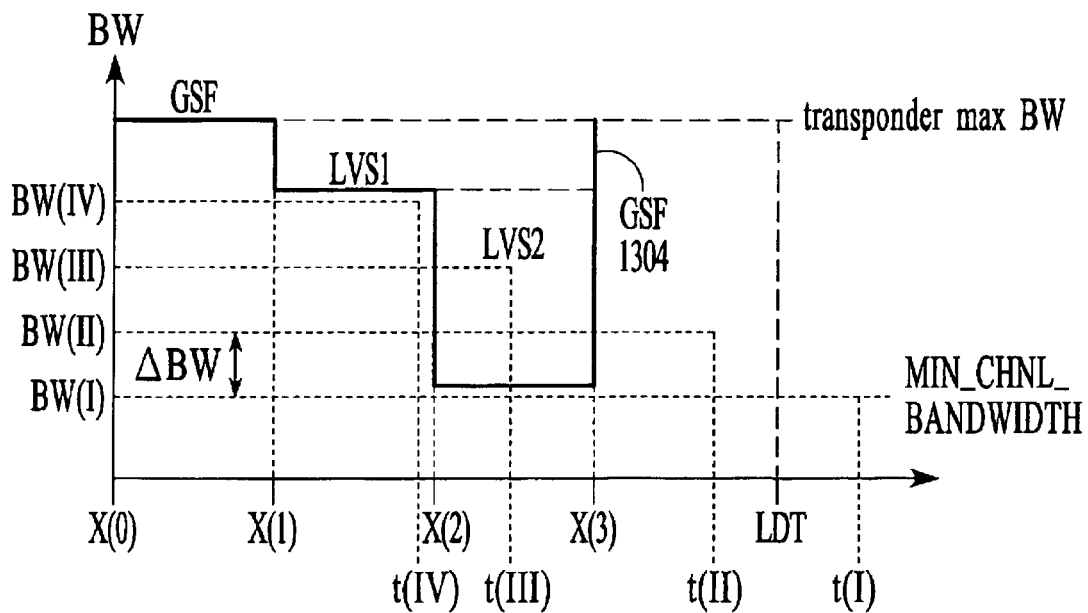
FIG. 13B illustrates the Minimum Possible Bandwidth strategy in accordance with the present invention.

FIGS. 13A–13B illustrate the application of these allocation strategies using step functions. FIG. 13A illustrates the Maximum Possible Bandwidth strategy in accordance with the present invention. Assume that step function 1302 is the GSF and that the strip for a given file transmission task has an area A and its transmission is to begin at time $X(0)$. Assume also that if the strip is allocated a bandwidth $BW(0)$, then its transmission will last until time $t(0)$; if the strip is allocated a bandwidth $BW(1)$, then its transmission will last until time $t(1)$; and if the strip is allocated a bandwidth $BW(5)$, then its transmission will last until time $t(5)$. In all three cases, the strip has the area A.

Under the Maximum Possible Bandwidth strategy, the Allocation Request function begins with the highest bandwidth for the GSF, $BW(0)$. For this bandwidth, the transmission lasts from $X(0)$ to $t(0)$. However, during this time period, the available bandwidth drops below $BW(0)$ at $X(1)$ and $X(5)$, both before the transmission would end at $t(0)$. Thus, $BW(0)$ cannot be allocated to the file transmission task.

The next highest bandwidth, $BW(1)$, is then evaluated. For $BW(1)$, the transmission lasts from $X(0)$ to $t(1)$. However, during this time period, the available bandwidth drops below $BW(1)$ at $X(5)$, before the transmission ends. Thus, $BW(1)$ also cannot be allocated to the file transmission task.

The third highest bandwidth $BW(5)$ is then evaluated. For this bandwidth, the transmission lasts from $X(0)$ to $t(5)$. During this time period, the bandwidth does not drop below $BW(5)$. In addition, $t(5)$ is sooner than the task's LDT. Thus, assuming all other boundary conditions are met, a bandwidth $BW(5)$ will allocate to the file transmission task the maximum possible available bandwidth while also delivering the files on time. The file transmission task is then allocated a bandwidth of $BW(5)$ under the Maximum Possible Bandwidth strategy.

FIG. 13B illustrates the Minimum Possible Bandwidth strategy in accordance with the present invention. Assume that step function 1304 is the GSF and that the strip for a given file transmission task has an area B and its transmission is to begin at time $X(0)$. Assume also that if the strip is allocated a bandwidth $BW(I)$, then its transmission will last until time $t(I)$; if the strip is allocated a bandwidth $BW(II)$, then its transmission will last until time $t(II)$; if the strip is allocated a bandwidth $BW(III)$, then its transmission will last until time $t(III)$; and if the strip is allocated a bandwidth $BW(IV)$, then its transmission will last until time $t(IV)$. In all four cases, the strip has the area B.

Under the Minimum Possible Bandwidth strategy, the Allocation Request function begins with the lowest bandwidth for the GSF, BW(I). For this bandwidth, the transmission lasts from X(0) to t(I). However, the ending time t(1) for the transmission would be later than the task's LDT. Thus, BW(I) cannot be allocated to the file transmission task since the files would not be delivered on time.

The next to the lowest bandwidth, BW(II), is then evaluated. For BW(II), the transmission lasts from X(0) to t(II). The ending time t(II) is sooner than the task's LDT, however, the available bandwidth drops below BW(II) at X(2) before the transmission ends. Thus, BW(II) cannot be allocated to the file transmission task.

The third lowest bandwidth, BW(III), is then evaluated. For BW(III), the transmission lasts from X(0) to t(III). However, during this time period, the available bandwidth drops below BW(III) at X(2), before the transmission ends. Thus, BW(III) also cannot be allocated to the file transmission task.

The fourth lowest bandwidth, BW(IV), is then evaluated. For this bandwidth, the transmission lasts from X(0) to t(IV). During this time period, the bandwidth does not drop below BW(IV). In addition, t(IV) is sooner than the task's LDT. Thus, assuming all other boundary conditions are met, a bandwidth BW(IV) will allocate to the file transmission task the minimum possible available bandwidth while also delivering the files on time.

Returning to FIG. 12, the function determines if the customer has chosen the Maximum Possible Bandwidth allocation strategy, via step 1216. If not, then the chosen allocation strategy is Minimum Possible Bandwidth, and the lowest possible bandwidth strip is allocated to meet the task's deadline, via step 1218. If the allocation strategy is Maximum Possible Bandwidth, then the highest possible bandwidth strip is allocated to meet the task's deadline, via step 1220. The function then determines if the allocation was successful, via step 1222. If not, then an error is returned, via step 1214. Uplink 214 will try again later to allocate bandwidth to transmit this task, until the allocation request to the UBS 216 either succeeds, or fails with an error code from the UBS 216 that specifically indicates that this task cannot meet its LDT under any circumstances. If the allocation was successful, then the allocated bandwidth strip is set in the task data, via step 1224, and the database tables 218 are updated, via step 1226. Then, access to the GSF is unlocked, via step 1228.

Once the bandwidth is allocated, the files in the file transmission task are transmitted by Uplink 214. Any unused allocated bandwidth may then be freed by invoking the Free Allocated Bandwidth function.

Free Allocated Bandwidth Function

Figure 14:
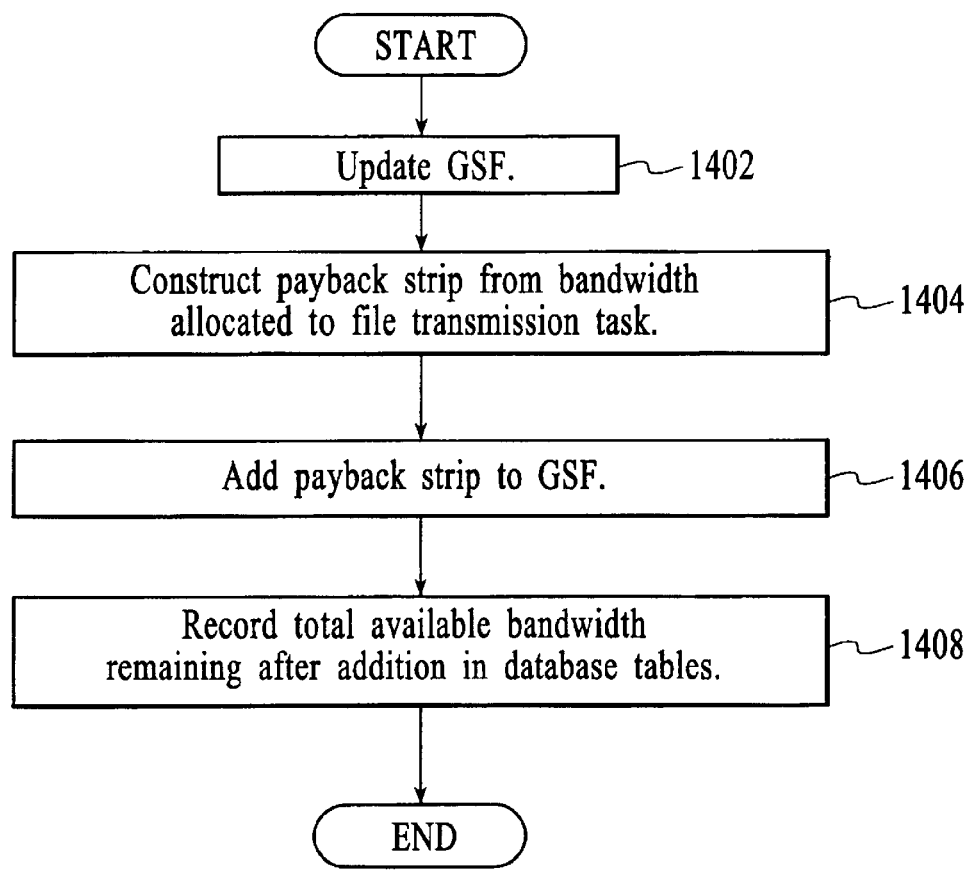
FIG. 14 is a flow chart illustrating a preferred embodiment of the Free Allocated Bandwidth function in accordance with the present invention.

The Free Allocate Bandwidth function frees any remaining allocated bandwidth related to the transmission task, after the task's successful or failed completion. FIG. 14 is a flow chart illustrating a preferred embodiment of the Free Allocated Bandwidth function in accordance with the present invention. First, the GSF is updated, via step 1402, so that its first point corresponds to the current time. Next, a payback strip is constructed from the bandwidth allocated to the file transmission task, via step 1404. The payback strip represents the remaining bandwidth allocation of the task, the end of which has not yet passed. Next, the payback strip is added to the GSF, via step 1406. The total available bandwidth remaining after the addition is then recorded in the database tables 218, via step 1408.

Figure 15:
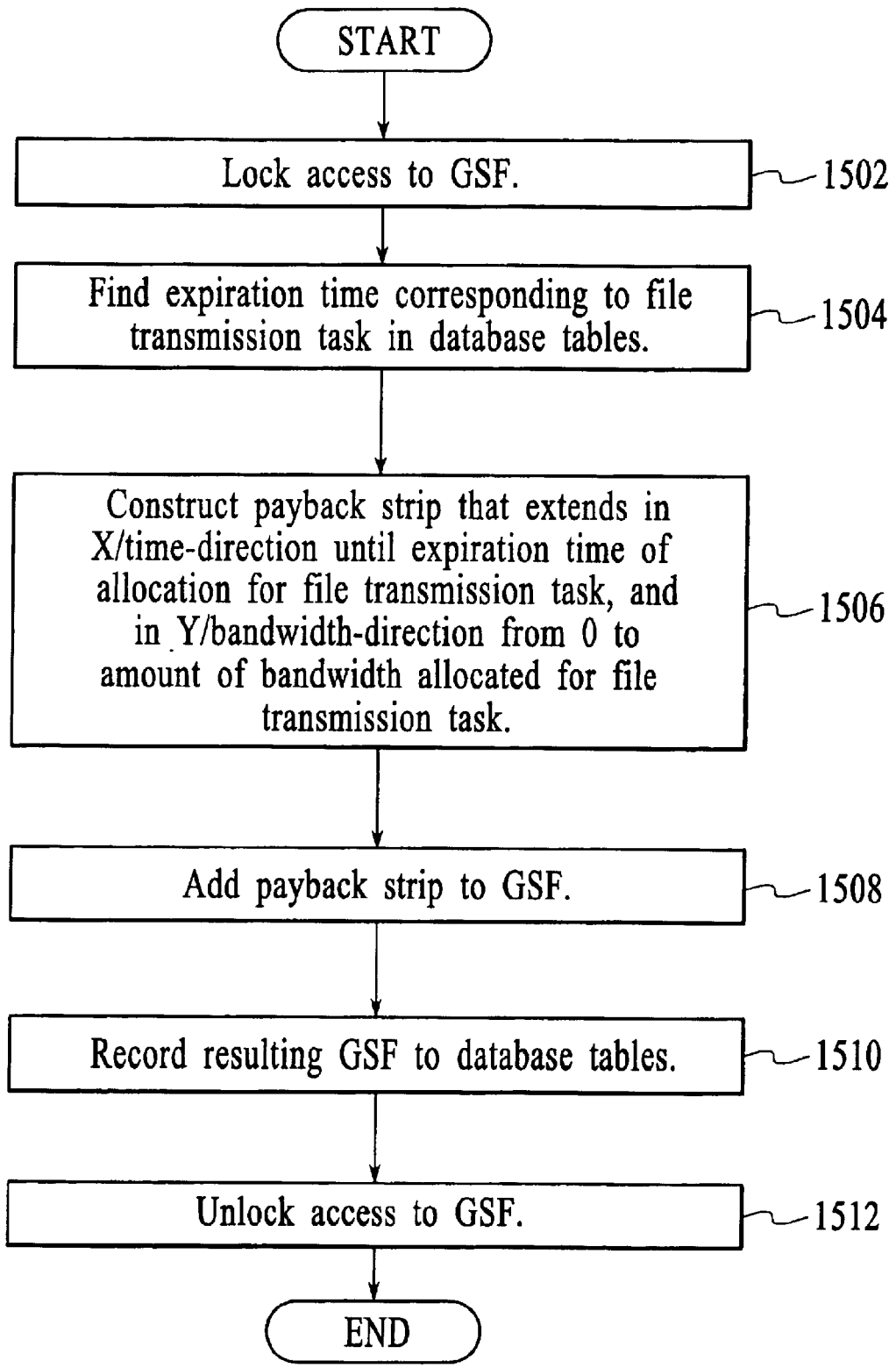
FIG. 15 is a flow chart illustrating in more detail the preferred embodiment of the Free Allocated Bandwidth function in accordance with the present invention.

FIG. 15 is a flow chart illustrating in more detail the preferred embodiment of the Free Allocated Bandwidth function in accordance with the present invention. First, access to the GSF is locked, via step 1502. Next, the expiration time corresponding to the file transmission task is found in the database tables 218, via step 1504. The payback strip is then constructed, via step 1506. The payback strip extends in the X/time-direction from the current time until the expiration time of the allocation for the file transmission task, and in the Y/bandwidth-direction from zero to the amount of bandwidth allocated for the file transmission task. The payback strip is added to the GSF, via step 1508. This makes the remainder of the bandwidth originally allocated for the file transmission task available for re-allocation for other file transmissions. The resulting GSF is recorded in the database tables 218, via step 1510, and access to the GSF is unlocked, via step 1512.

Although the preferred embodiment of the UBS 216 is described with the function above, one of ordinary skill in the art will understand that other functions may be used to allocated different amounts of available bandwidth to different file transmission tasks without departing from the spirit and scope of the present invention.

Two extensions are available for the UBS 216 in accordance with the present invention: forward scheduling and non-constant allocations.

Forward Scheduling

For the preferred embodiment of the UBS 216, the precise duration of a file transmission task is unknown, due to possible re-transmissions of incorrectly received data. Therefore, the bandwidth allocations were made by estimating the total transmission time as a factor of the minimum transmission duration in the case of no transmission errors, the time for possible re-transmission of incorrectly received data, and some pre- and post-processing overhead. No bandwidth is wasted in this embodiment because after the transmission task's actual finish, it would pay back any unused portion of its resource allocation.

However, before a given task, T, had finished, it is impractical to schedule another task, T+1, to begin immediately after the end of the bandwidth allocation of the task T. If the task T finishes before the very end of its allocation, it would leave a gap of unused bandwidth until the beginning of the task T+1. This would waste bandwidth.

To further minimize the waste of bandwidth, forward scheduling may be applied to the UBS 216 in any scenario where the actually used duration of a resource allocation is known at the time the allocation is made. One example is the transmission of files to receivers 206 that do not have a continuously operating network connection to the central site 202. These receivers 206 could not immediately report transmission errors or reception errors to the central site 202. Instead, they would call back with the report some time after the entire transmission. Therefore, the central site 202 can transmit a given file for a fixed amount of time, possibly multiple times, until a sufficiently high fraction of all addressed receivers 206 are expected to have received the file correctly. In this situation, the actual duration of use of the resource allocation is precisely known, and the transmission tasks can be scheduled back-to-back, where the allocation of bandwidth for the task T+1, can be scheduled immediately at the end of the allocation for task T. The waste of bandwidth in file transmission is thus further reduced, and a tight transmission schedule can be achieved, in the case where the receiver 206 has no continuously operating back-connection to the central site 202 to report data reception errors as soon as they occur.

Non-Constant Allocations

To further reduce waste of bandwidth, the non-constant allocation extension may be applied to the UBS 216 to allow the scheduling and allocation of an amount of bandwidth that is not constant over the duration of its allocation. Instead, the amount of allocated bandwidth can be a polynomial function of time, provided that at the time the allocation request is made, the requested amount of bandwidth as a function of time is known throughout the time interval the request spans. This allows, for example, a bandwidth allocation to begin with a small step to announce the file name to the addressed receivers 206. Then it could linearly ramp up to a much higher constant value, to transmit the file to all addressed receivers 206. The allocated amount could taper off to account for a continually decreasing amount of unsatisfied re-transmissions of incorrectly received file data.

The forward scheduling and non-constant allocations extensions give the UBS 216 more flexibility and further decreases the waste of bandwidth in file transmissions because they allow tightly fit, known, non-constant bandwidth demands, rather than having to allocate a rectangular strip circumscribing the actual demand.

A method and system for an improved bandwidth allocation scheduler for media delivery has been disclosed. The bandwidth allocation scheduler in accordance with the present invention comprises a set of program segments that provide fast, deterministic real-time scheduling for the allocation of bandwidth for file transmissions. It allows the bandwidth allocated to a delivery to vary according to the amount of bandwidth available. A different amount of bandwidth may be allocated to each individual file transmission tasks. Higher priority transmissions may be allocated bandwidth before allocation to lower priority file transmissions. The maximum bit rate of the slowest addressed receiver may be considered in allocating the bandwidth. Moreover, the customer can choose between different allocation strategies. Thus, the bandwidth allocation scheduler in accordance with the present invention reduces waste in bandwidth in media delivery, which in turn reduces costs for a customer.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for media delivery in a network, comprising the steps of:

(a) determining an available bandwidth for file transmission for a time interval, comprising the steps of:
  (a1) updating a total available bandwidth for the time interval, comprising the steps of:
    (a1i) reading from a plurality of database tables a plurality of live-video stream (LVS) jobs to begin during the time interval,
    (a1ii) allocating bandwidth to the plurality of LVS jobs not yet allocated bandwidth, and
    (a1iii) recording the allocated bandwidth to the plurality of LVS jobs in the plurality of database tables, and
  (a2) checking for the available bandwidth for file transmission for the time interval, comprising the steps of:
    (a2i) updating a global step function (GSF),
    (a2ii) determining if enough bandwidth is available for file transmissions,
    (a2iii) sending an indication if there is not enough bandwidth available for file transmission, and
    (a2iv) finding a bandwidth strip which begins at a current time, fits under the GSF, has at least a minimum amount of bandwidth that must be allocated to a file transmission task, and does not extend, in the X/time-direction, beyond a latest delivery time (LDT) of the at least one transmission task; and (b) allocating at least a portion of the available bandwidth to at least one file transmission task, wherein each of the at least one file transmission task may be allocated a different amount of the available bandwidth.

2. The method of claim 1, wherein the finding step (a2iv) comprises the step of:
  (a2ivA) finding the bandwidth strip that extends in an X/time-direction from a current time to no more than a maximum transmission duration, and in a Y/bandwidth-direction from zero to no more than a value of the GSF at any X/time value spanned by the bandwidth strip;
  (a2ivB) determining if an area of the bandwidth strip is no smaller than a predetermined area;
  (a2ivC) indicating not enough bandwidth for file transmission if the area of the largest found bandwidth strip is smaller than the predetermined area, or is not within a plurality of pre-determined boundary conditions; and
  (a2ivD) returning a size limitation for the at least one file transmission task if the area of the bandwidth strip is smaller than the predetermined area.

3. A method for media delivery in a network, comprising the steps of:

(a) determining an available bandwidth for file transmission for a time interval; and
(b) allocating at least a portion of the available bandwidth to at least one file transmission task, wherein each of the at least one file transmission task may be allocated a different amount of the available bandwidth, comprising the steps of:
  (b1) setting an upper bound on an amount of bandwidth to a smaller of the available bandwidth and a maximum bit rate of a plurality of receivers,
  (b2) gathering data for the at least one file transmission task, the gathered data including a size of the at least one file transmission task,
  (b3) determining an allocation strategy selected by a customer,
  (b4) computing an overhead for the at least one file transmission task, wherein the computing step (b4) comprises the steps of:
    (b4i) computing a total transmission overhead for the at least one file transmission task, and
    (b4ii) converting the task size and the total transmission overhead into an area,
  (b5) allocating the portion of the available bandwidth based on the upper bound, the size of the at least one transmission task, the computed overhead, and the allocation strategy selected by the customer, and
  (b6) recording the available bandwidth remaining after the allocation in a plurality of database tables.

4. A method for media delivery in a network, comprising the steps of:

(a) determining an available bandwidth for file transmission for a time interval; and
(b) allocating at least a portion of the available bandwidth to at least one file transmission task, wherein each of the at least one file transmission task may be allocated a different amount of the available bandwidth, comprising the steps of:
- (b1) setting an upper bound on an amount of bandwidth to a smaller of the available bandwidth and a maximum bit rate of a plurality of receivers,
- (b2) gathering data for the at least one file transmission task, the gathered data including a size of the at least one file transmission task,
- (b3) determining an allocation strategy selected by a customer,
- (b4) computing an overhead for the at least one file transmission task,
- (b5) allocating the portion of the available bandwidth based on the upper bound, the size of the at least one transmission task, the computed overhead, and the allocation strategy selected by the customer, wherein the allocating step (b5) comprises the steps of:
  - (b54i) determining if the at least one file transmission task can be completed before a deadline,
  - (b5ii) returning an error if the at least one file transmission task can not be completed before the deadline,
  - (b5iii) allocating a lowest possible bandwidth strip to meet the deadline to the at least one file transmission task if the bandwidth allocation strategy is Minimum Possible Bandwidth,
  - (b5iv) allocating a highest possible bandwidth strip to meet the deadline if the bandwidth allocation strategy is Maximum Possible Bandwidth,
  - (b5v) determining if the allocating step (b5iv) completed successfully,
  - (b5vi) returning an error if the allocating step (b5iv) did not complete successfully, and
  - (b5vii) setting the allocated bandwidth and duration of allocation in the task data if the allocating step (b5iv) completed successfully,
- (b6) recording the available bandwidth remaining after the allocation in a plurality of database tables.

5. A method for media delivery in a network, comprising the steps of:
- (a) determining an available bandwidth for completion of a file transmission for a time interval, wherein the time interval is a current time plus a maximum duration for a completion of at least one file transmission task;
- (b) allocating at least a portion of the available bandwidth to complete the at least one file transmission task, wherein each of the at least one file transmission task may be allocated a different amount of the available bandwidth; and
- (c) freeing any allocated available bandwidth unused by a complete transmission of the at least one file transmission task, comprising:
  - (c1) updating a global step function (GSF), wherein the GSF represents a total maximum bandwidth available in the network in the time interval for completion of the file transmission;
  - (c2) constructing a payback strip from the portion of the available bandwidth allocated to the at least one file transmission task;
  - (c3) adding the payback strip to the GSF; and
  - (c4) recording an available bandwidth remaining after the adding step (c3) in a plurality of database tables.

6. A method for media delivery in a network, comprising the steps of:
- (a) determining an available bandwidth for file transmission for a time interval;
- (b) allocating at least a portion of the available bandwidth to at least one file transmission task, wherein each of the at least one file transmission task may be allocated a different amount of the available bandwidth; and
- (c) freeing any allocated available bandwidth unused by a transmission of the at least one file transmission task, comprising the steps of:
  - (c1) updating a global step function (GSF),
  - (c2) constructing a payback strip from the portion of the available bandwidth allocated to the at least one file transmission task, comprising the steps of:
    - (c2i) finding an expiration time corresponding to the at least one file transmission task in the plurality of database tables, and
    - (c2ii) constructing the payback strip that extends in an X/time-direction until the expiration time and in a Y/bandwidth direction from zero to the portion of the available bandwidth allocated to the at least one file transmission task,
  - (c3) adding the payback strip to the GSF, and
  - (c4) recording an available bandwidth remaining after the adding step (c3) in a plurality of database tables.

7. A computer readable medium with program instructions for media delivery in a network, the instructions for:
- (a) determining an available bandwidth for file transmission for a time interval, comprising the instructions for:
  - (a1) updating a total available bandwidth for the time interval, comprising the instructions for:
    - (a1i) reading from a plurality of database tables a plurality of live-video stream (LVS) jobs to begin during the time interval,
    - (a1ii) allocating bandwidth to the plurality of LVS jobs not yet allocated bandwidth, and
    - (a1iii) recording the allocated bandwidth to the plurality of LVS jobs in the plurality of database tables, and
  - (a2) checking for the available bandwidth for file transmission for the time interval, comprising the steps of:
    - (a2i) updating a global step function (GSF),
    - (a2ii) determining if enough bandwidth is available for file transmissions,
    - (a2iii) sending an indication if there is not enough bandwidth available for file transmission, and
    - (a2iv) finding a bandwidth strip which begins at a current time, fits under the GSF, has at least a minimum amount of bandwidth that must be allocated to a file transmission task, and does not extend, in the X/time-direction, beyond a LDT of the at least one transmission task; and
- (b) allocating at least a portion of the available bandwidth to at least one file transmission task, wherein each of the at least one file transmission task may be allocated a different amount of the available bandwidth.

8. The medium of claim 7, wherein the finding instruction (a2iv) comprises the instructions for:
- (a2ivA) finding the bandwidth strip that extends in an X/time-direction from a current time to no more than a maximum transmission duration, and in a Y/bandwidth-direction from zero to no more than a value of the GSF at any X/time value spanned by the bandwidth strip;

(a2ivB) determining if an area of the bandwidth strip is no smaller than a predetermined area;

(a2ivC) indicating not enough bandwidth for file transmission if the area of the largest found bandwidth strip is smaller than the predetermined area, or is not within a plurality of pre-determined boundary conditions; and (a2ivD) returning a size limitation for the at least one file transmission task if the area of the bandwidth strip is smaller than the predetermined area.

9. A computer readable medium with program instructions for media delivery in a network, the instructions for:

(a) determining an available bandwidth for file transmission for a time interval; and (b) allocating at least a portion of the available bandwidth to at least one file transmission task, wherein each of the at least one file transmission task may be allocated a different amount of the available bandwidth, comprising the instructions for:

(b1) setting an upper bound on an amount of bandwidth to a smaller of the available bandwidth and a maximum bit rate of a plurality of receivers, (b2) gathering data for the at least one file transmission task, the gathered data including a size of the at least one file transmission task, (b3) determining an allocation strategy selected by a customer, (b4) computing an overhead for the at least one file transmission task, wherein the computing instruction (b4) comprises the steps of:

(b4i) computing a total transmission overhead for the at least one file transmission task, and (b4ii) converting the task size and the total transmission overhead into an area, (b5) allocating the portion of the available bandwidth based on the upper bound, the size of the at least one transmission task, the computed overhead, and the allocation strategy selected by the customer, and (b6) recording the available bandwidth remaining after the allocation in a plurality of database tables.

10. A computer readable medium with program instructions for media delivery in a network, the instructions for:

(a) determining an available bandwidth for file transmission for a time interval; and (b) allocating at least a portion of the available bandwidth to at least one file transmission task, wherein each of the at least one file transmission task may be allocated a different amount of the available bandwidth, comprising the instructions for:

(b1) setting an upper bound on an amount of bandwidth to a smaller of the available bandwidth and a maximum bit rate of a plurality of receivers, (b2) gathering data for the at least one file transmission task, the gathered data including a size of the at least one file transmission task, (b3) determining an allocation strategy selected by a customer, (b4) computing an overhead for the at least one file transmission task, (b5) allocating the portion of the available bandwidth based on the upper bound, the size of the at least one transmission task, the computed overhead, and the allocation strategy selected by the customer, wherein the allocating instruction (b5) comprises the instructions for:

(b54i) determining if the at least one file transmission task can be completed before a deadline, (b5ii) returning an error if the at least one file transmission task can not be completed before the deadline, (b5iii) allocating a lowest possible bandwidth strip to meet the deadline to the at least one file transmission task if the bandwidth allocation strategy is Minimum Possible Bandwidth, (b5iv) allocating a highest possible bandwidth strip to meet the deadline if the bandwidth allocation strategy is Maximum Possible Bandwidth, (b5v) determining if the allocating step (b5iv) completed successfully, (b5vi) returning an error if the allocating step (b5iv) did not complete successfully, and (b5vii) setting the allocated bandwidth and duration of allocation in the task data if the allocating step (b5iv) completed successfully, and (b6) recording the available bandwidth remaining after the allocation in a plurality of database tables.

11. A computer readable medium with program instructions for media delivery in a network, the instructions for:

(a) determining an available bandwidth for completion of a file transmission for a time interval, wherein the time interval is a current time plus a maximum duration for a completion of at least one file transmission task;

(b) allocating at least a portion of the available bandwidth to complete the at least one file transmission task, wherein each of the at least one file transmission task may be allocated a different amount of the available bandwidth;

(c) freeing any allocated available bandwidth unused by a complete transmission of the at least one file transmission task, comprising:

(c1) updating a global step function (GSF), wherein the GSF represents a total maximum bandwidth available in the network in the time interval for completion of the file transmission;

(c2) constructing a payback strip from the portion of the available bandwidth allocated to the at least one file transmission task;

(c3) adding the payback strip to the GSF; and (c4) recording an available bandwidth remaining after the adding step (c3) in a plurality of database tables.

12. A computer readable medium with program instructions for media delivery in a network, the instructions for:

(a) determining an available bandwidth for file transmission for a time interval;

(b) allocating at least a portion of the available bandwidth to at least one file transmission task, wherein each of the at least one file transmission task may be allocated a different amount of the available bandwidth; and (c) freeing any allocated available bandwidth unused by a transmission of the at least one file transmission task, comprising the instructions for:

(c1) updating a global step function (GSF), (c2) constructing a payback strip from the portion of the available bandwidth allocated to the at least one file transmission task, comprising the instructions for:
  (c2i) finding an expiration time corresponding to the at least one file transmission task in the plurality of database tables, and
  (c2ii) constructing the payback strip that extends in an X/time-direction until the expiration time and in a Y/bandwidth direction from zero to the portion of the available bandwidth allocated to the at least one file transmission task,
(c3) adding the payback strip to the GSF, and
(c4) recording an available bandwidth remaining after the adding step (c3) in a plurality of database tables.

13. The method of claim 6, wherein the at least one file transmission task is scheduled back-to-back when duration of allocations are known when the allocations are made.

14. The method of claim 6, wherein the allocation of the available bandwidth to the at least one file transmission task is varied as a polynomial in time.

15. The medium of claim 12, wherein the at least one file transmission task is scheduled back-to-back when duration of allocations are known when the allocations are made.

16. The medium of claim 12, wherein the allocation of the available bandwidth to the at least one file transmission task is varied as a polynomial in time.

* * * * *

UNITED STATES PATENT AND TRADEMARK OFFICE
CERTIFICATE OF CORRECTION

PATENT NO. : 6,947,388 B1  Page 1 of 1
DATED : September 20, 2005
INVENTOR(S) : Marcus Wagner It is certified that error appears in the above-identified patent and that said Letters Patent is hereby corrected as shown below:

Title page,
Item [73], Assignee, delete "Amonk" and insert -- Armonk --.

Column 7,
Line 1, add -- not -- after "is" and before "enough".
Line 30, delete "transmission" and replace with -- retransmission --.
Line 36, delete "allocated" and replace with -- allocates --.

Column 8,
Line 18, delete "illustrate" and replace with -- illustrates --.

Column 10,
Line 59, delete "transmission" and replace with -- transmissions --.

Column 11,
Line 42, delete "of" and replace with -- or --.

Signed and Sealed this

Fourth Day of April, 2006

JON W. DUDAS
*Director of the United States Patent and Trademark Office*